(12) United States Patent
Riegel

(10) Patent No.: US 11,100,825 B2
(45) Date of Patent: *Aug. 24, 2021

(54) TRANSLUCENT DIGITAL DISPLAY SYSTEM

(71) Applicant: Stratacache, Inc., Dayton, OH (US)

(72) Inventor: Christopher K Riegel, Dayton, OH (US)

(73) Assignee: STRATACACHE, INC., Dayton, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/338,919

(22) Filed: Oct. 31, 2016

(65) Prior Publication Data
US 2017/0046991 A1   Feb. 16, 2017

Related U.S. Application Data

(63) Continuation of application No. 13/411,374, filed on Mar. 2, 2012, now Pat. No. 9,514,661.
(Continued)

(51) Int. Cl.
*G09F 9/35* (2006.01)
*F21V 8/00* (2006.01)
(Continued)

(52) U.S. Cl.
CPC ......... *G09F 23/065* (2013.01); *G02B 6/0041* (2013.01); *G02B 6/0093* (2013.01);
(Continued)

(58) Field of Classification Search
CPC . G09F 23/065; G09F 9/35; G09F 9/33; G09F 2023/0033; G02B 6/0093;
(Continued)

(56) References Cited

U.S. PATENT DOCUMENTS 3,629,972 A   12/1971   Rehberg et al.
4,371,870 A   2/1983    Biferno
(Continued)

FOREIGN PATENT DOCUMENTS

CN          101949526 A  *  1/2011   ........... G02B 6/0085
IL    WO 2010116202 A1 *  10/2010   ............... G06T 5/00
(Continued)

OTHER PUBLICATIONS

"Samsung uVending Machines", www.techfresh.net, Jan. 8, 2009.

*Primary Examiner* — Patrick N Edouard
*Assistant Examiner* — Douglas M Wilson
(74) *Attorney, Agent, or Firm* — Dickinson Wright PLLC

(57) ABSTRACT

A digital display system includes a transparent outer protective panel, a transparent inner protective panel, and a translucent digital video display located between the outer and inner protective panels. An integrated media player is operably connected to the translucent digital video display so that full-motion videos displayed on the translucent digital video display are viewed through the outer protective panel and items can be viewed through the translucent digital video display. The digital display system can be incorporated into any environment where a product is located behind a glass enclosure such as freezers, coolers, security glass, jewelry cases, liquor cases, cosmetic cases, and the like. In retail environments, the digital display systems can also be incorporated into entry doors, windows, drive-thru windows, teller windows, and any other location where there is traditionally glass and you want to focus consumer attention obstructing the customer's line of site.

16 Claims, 8 Drawing Sheets

Related U.S. Application Data

(60) Provisional application No. 61/448,455, filed on Mar. 2, 2011.

(51) Int. Cl.
*G02F 1/13357* (2006.01)
*G09F 9/33* (2006.01)
*H04N 5/64* (2006.01)
*A47F 3/04* (2006.01)
*G09F 23/00* (2006.01)
*G02F 1/1333* (2006.01)
*G09F 23/06* (2006.01)
*A47F 3/00* (2006.01)

(52) U.S. Cl.
CPC ..... *G02B 6/0095* (2013.01); *G02F 1/133615* (2013.01); *G09F 9/33* (2013.01); *G09F 9/35* (2013.01); *H04N 5/64* (2013.01); *A47F 3/001* (2013.01); *A47F 3/043* (2013.01); *G02F 1/133308* (2013.01); *G02F 1/133342* (2021.01); *G02F 2203/02* (2013.01); *G09F 2023/0033* (2013.01)

(58) Field of Classification Search
CPC ...... G02B 6/0041; G02B 6/0095; H04N 5/64; G02F 1/133615; G02F 1/133342; G02F 1/133308; G02F 2203/02; A47F 3/001; A47F 3/043
See application file for complete search history.

(56) References Cited

U.S. PATENT DOCUMENTS

| | | | |
|---|---|---|---|
| 7,413,233 B1 | 8/2008 | Jung | |
| 8,578,081 B1 * | 11/2013 | Fils | G06F 1/1632 710/303 |
| 2002/0064037 A1 | 5/2002 | Lee | |
| 2003/0117790 A1 | 6/2003 | Lee et al. | |
| 2004/0160388 A1 | 8/2004 | O'Keeffe | |
| 2006/0215958 A1 | 9/2006 | Yeo | |
| 2008/0024047 A1 * | 1/2008 | Juo | F25D 23/02 312/405 |
| 2008/0094854 A1 | 4/2008 | Coleman | |
| 2009/0121970 A1 | 5/2009 | Ozbek | |
| 2010/0026912 A1 | 2/2010 | Ho | |
| 2010/0275477 A1 | 11/2010 | Kim | |
| 2010/0293827 A1 | 11/2010 | Suss et al. | |
| 2010/0309687 A1 * | 12/2010 | Sampsell | G02B 6/0053 362/627 |
| 2012/0020560 A1 * | 1/2012 | Zarubinsky | G06T 5/10 382/173 |
| 2012/0090246 A1 * | 4/2012 | Nunez-Regueiro | C03C 17/3652 49/484.1 |
| 2012/0105424 A1 * | 5/2012 | Lee | G07F 9/023 345/212 |
| 2012/0105428 A1 * | 5/2012 | Fleck | G06F 3/1438 345/419 |
| 2012/0206500 A1 | 8/2012 | Koprowski | |
| 2012/0206941 A1 * | 8/2012 | He | G02B 6/0073 362/613 |
| 2014/0032806 A1 * | 1/2014 | Fils | G06F 1/16 710/303 |
| 2014/0062316 A1 | 3/2014 | Tischler | |
| 2014/0137065 A1 | 5/2014 | Feng | |
| 2020/0081564 A1 * | 3/2020 | Lee | G07F 9/105 |

FOREIGN PATENT DOCUMENTS

| | | | |
|---|---|---|---|
| JP | 09042924 A | * | 2/1997 |
| JP | 2004294705 | | 10/2004 |
| JP | 2010171010 A | * | 8/2010 |
| JP | 2010171010 A | * | 8/2010 |
| KR | 20020036508 | | 11/2009 |
| WO | WO2006055873 | | 5/2006 |
| WO | WO2010001026 | | 1/2010 |

* cited by examiner

TRANSLUCENT DIGITAL DISPLAY SYSTEM

CROSS-REFERENCE TO RELATED APPLICATIONS

This application is a continuation of U.S. patent application Ser. No. 13/411,374, filed Mar. 2, 2012, which claims the benefit of priority to U.S. Provisional Patent Application Ser. No. 61/448,455, filed Mar. 2, 2011, the disclosures of which applications are incorporated herein by reference in their entireties.

STATEMENT REGARDING FEDERALLY SPONSORED RESEARCH

Not Applicable

PARTIES TO A JOINT RESEARCH AGREEMENT

Not Applicable

REFERENCE TO APPENDIX

Not Applicable

FIELD OF THE INVENTION

The field of the present invention generally relates to digital display systems and, more particularly, to translucent digital display systems having glass packaging.

BACKGROUND OF THE INVENTION

In consumer retail environments today, there is a desire on the part of brands and retailers to place messages in front of the consumer at their "point of purchase" or "point of product selection". Historically in retail, banking, quick service restaurants (QSR), hospitality, etc. (and out-of-home advertising in general) this messaging has been paper based signage, but in the past several years, this has evolved to be digital signage (consisting of a plasma or LCD display, a media player, and network connectivity) to drive a more dynamic message to the consumer using graphics, motion video, interactivity and a more dynamic visual presentation to gain the customers' attention and thus have the customer notice the message or product promotion in front of them.

This methodology has worked well, however by the very nature of LCD panels and their associated hardware, the use of digital signage in retail sites and out-of-home environments is limited by the way in which the LCD panels function. Primarily, LCD panels are designed as a visual display technology which presents a message to the consumer, but obstructs the product or any object behind the LCD panel because the LCD panel is opaque. Because traditional LCD panels obstruct the view of any product behind them and cause "line of site" challenges within the retail environment, they are limited in their effective use. Accordingly, there is a need in the art for improved digital display systems.

SUMMARY OF THE INVENTION

Disclosed are digital display systems and methods that overcome at least one of the disadvantages of the prior art described above. Disclosed is a digital display system comprising, in combination, a transparent outer protective panel, a transparent inner protective panel, and a translucent digital video display located between the outer and inner protective panels. An integrated media player operably connected to the translucent digital video display so that full-motion videos displayed on the translucent digital video display are viewed through the outer protective panel and items located behind the inner protective panel can be viewed through the translucent digital video display.

Also disclosed is a digital display system comprising, in combination, a transparent outer protective panel, a transparent inner protective panel, and a translucent digital video display located between the outer and inner protective panels, and a light guide including a glass panel secured to the translucent video display. The glass panel includes micro-particles therein for reflecting light. A light source is adjacent an edge of the glass panel to provide light within the glass panel that strikes the micro-particles and is reflected out through the outer protective panel. A media player is operably connected to the translucent digital video display so that full-motion videos displayed on the translucent digital video display are viewed through the outer protective panel and items located behind the inner protective panel can be viewed through the translucent digital video display.

Also disclosed is a digital display system comprising, in combination, a transparent outer protective panel, a transparent inner protective panel, a translucent LCD video display located between the outer and inner protective panels, and a light guide including a glass panel is adhered to the translucent LCD video display. The glass panel includes micro-particles therein for reflecting light. At least one LED adjacent is provided to provide light within the glass panel that strikes the micro-particles and is reflected out through the outer protective panel to provide visibly uniform illumination through the outer protective panel at the LCD video display. A media player operably connected to the translucent LCD video display so that high definition, color, full-motion videos displayed on the translucent LCD video display are viewed through the outer protective panel and items located behind the inner protective panel can be viewed through the translucent LCD video display. A frame encircles peripheries of the outer and inner protective panels and the translucent LCD video display and the media player are sealed within the frame and the outer and inner protective panels.

From the foregoing disclosure and the following more detailed description of various preferred embodiments it will be apparent to those skilled in the art that the present invention provides a significant advance in the technology and art of digital display systems. Particularly significant in this regard is the potential the invention affords for systems and methods that focus consumer attention in a desired manner without obstructing the customer's line of site in a cost effective manner. Additional features and advantages of various preferred embodiments will be better understood in view of the detailed description provided below.

BRIEF DESCRIPTION OF THE DRAWINGS

These and further features of the present invention will be apparent with reference to the following description and drawing, wherein.

Figure 1:
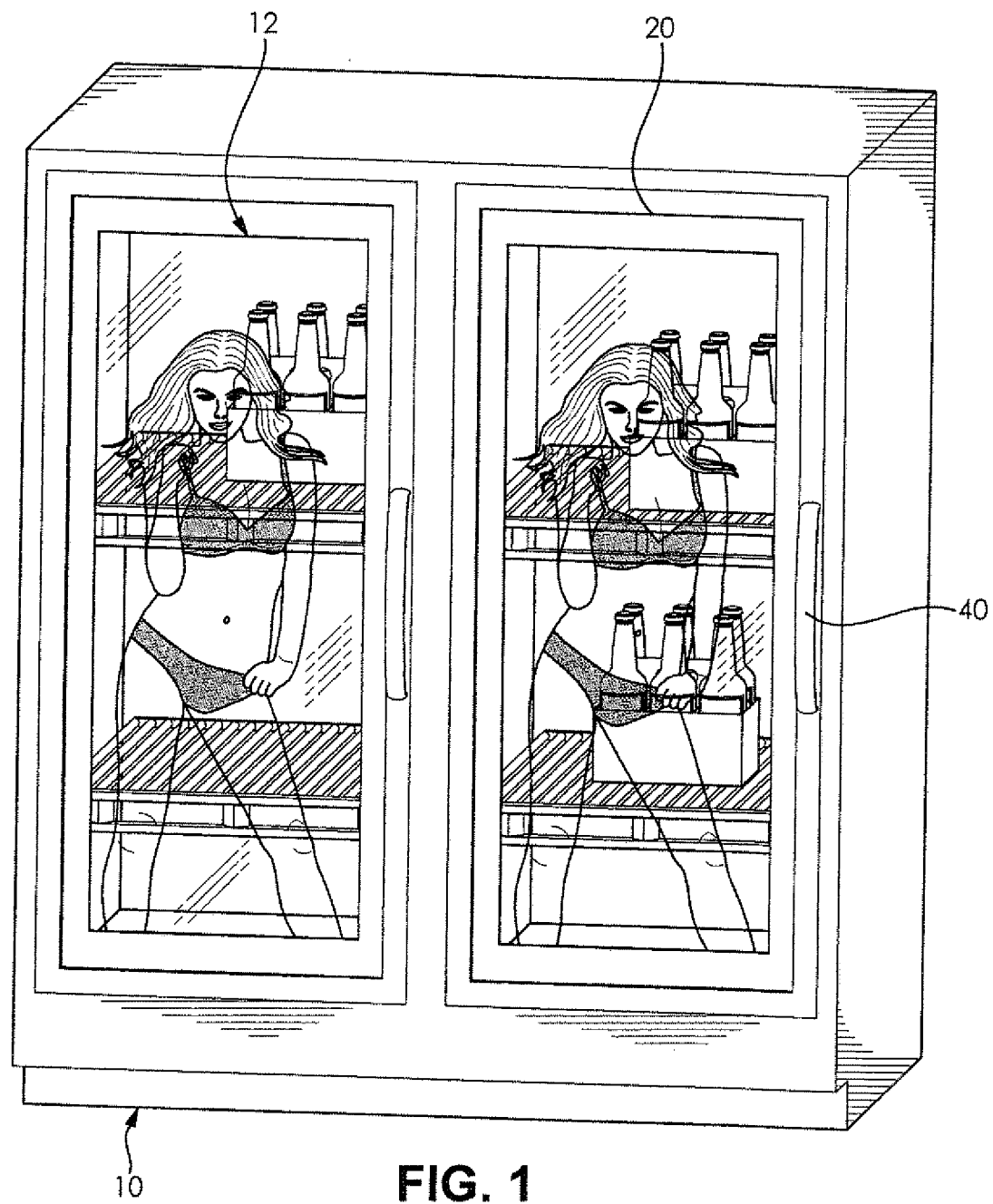
FIG. 1 is a perspective view of a double glass-door upright cooler incorporating a translucent digital display system according to the present invention.

It should be understood that the appended drawings are not necessarily to scale, presenting a somewhat simplified representation of various preferred features illustrative of the basic principles of the invention. The specific design features of the digital display systems as disclosed herein, including, for example, specific dimensions and shapes of the various components will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the digital display systems illustrated in the drawings.

WRITTEN DESCRIPTION OF THE ILLUSTRATED EMBODIMENTS

It will be apparent to those skilled in the art, that is, to those who have knowledge or experience in this area of technology, that many uses and design variations are possible for the improved digital display systems and methods disclosed herein. The following detailed discussion of various alternative and preferred embodiments will illustrate the general principles of the invention with regard to the specific application of glass displays and architectural glass. Other embodiments suitable for other applications will be apparent to those skilled in the art given the benefit of this disclosure.

Figure 2:
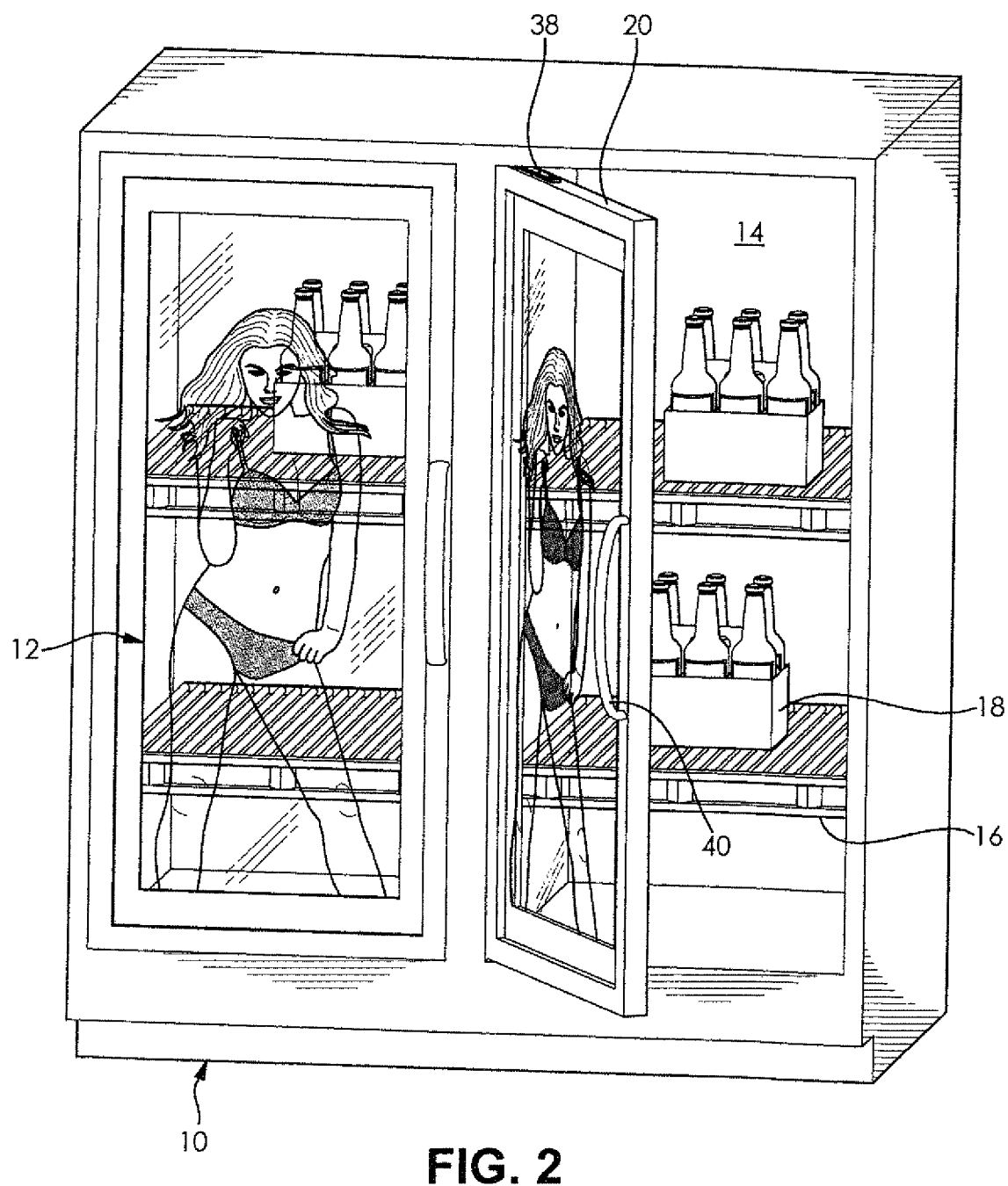
FIG. 2 is a perspective view of the upright cooler of FIG. 1, wherein one of the glass-doors is partially opened.

FIGS. 1 and 2 illustrate a double glass-door upright cooler or chiller 10 having translucent digital display systems 12 according to the present invention. The illustrated cooler 10 has an interior space 14 which is cooled by a suitable refrigeration system to keep product displayed therein at a desired temperature. The illustrated interior space 14 is provided with a plurality of shelves for holding product 18 thereon. The illustrated interior space 14 is also provided with a suitable light source for illuminating the interior space 14. The illustrated cooler 10 has two hinged doors 20 each provided with one of the translucent digital display systems 12 according to the present invention. It is noted that the cooler 10 can alternatively have a fewer or greater number of doors 20 and/or less than all of the doors 20 can be provided the translucent digital display systems 12. When the cooler 10 has more than one translucent digital display system 12 and/or there is more than one cooler 10, the translucent digital display systems 12 can be independent of one another or can interact together to provide an "array" experience for the consumer. Multiple cooler doors 20 can work together, spanning a digital image across 5, 10, or even 50 doors 20, and allowing consumer search on one door 20 to highlight product on another door 20, and allowing doors 20 to provide interactive consumer media in a large format as further described hereinbelow.

The illustrated cooler 10 has product or items 18 in the form of beer located on the shelves 16 within the cooled interior space 14 Additionally, a beer video advertisement is displayed on the translucent digital display systems 12 so that customers see the advertisement and can look straight through the advertisement on the translucent digital display systems 12 to see the product 18 on shelves 16 within the cooler 10 and behind the doors 20. While the illustrated digital display system 12 can display full motion video, it can also display still images, slide shows of still images, or any combination. To further engage consumers, the illustrated translucent digital display system 12 can display promotional coupons, product videos, social media interactions via 2D QR codes., and the like As shown in FIGS. 3 to 6, the illustrated digital display system 12 is incorporated into the cooler door 20 to form of the fully self-contained package such that it only requires being in electrical communication a power source 22 and wirelessly in data communication with central management server 24 to be fully functional. The illustrated translucent digital display system 12 comprises, in combination, a transparent outer protective panel or sheet 26, a transparent inner protective panel or sheet 28, a translucent digital video display 30 located between the outer and inner protective panels 26, 28, and an integrated media player 32 operably connected to the translucent digital video display 30 so that high definition, full-color, full-motion videos displayed on the translucent digital video display 30 are viewed through the outer protective panel 26 and items located behind the inner protective panel 28 can be viewed through the translucent digital video display 30.

The outer and inner protective panels 26, 28 preferably comprise glass but any other suitable material can alternatively be utilized. The illustrated cooler door 20 includes a single outer protective panel 26 and a single inner protective layer 28, but it is noted that there can alternatively be more than one outer protective panel 26 and/or there can alternatively be more than one inner protective panel 28. The illustrated inner and outer protective panels 26, 28 are spaced apart to form a space 34 therebetween and a frame 36 encircles a periphery of the outer and inner protective panels 26, 28. The frame 36 encloses outer edges of the protective panels 26, 28 and closes and seals the gap 34 between the protective panels 26, 28. The frame 36 is preferably formed of metal but can alternatively be formed of any other suitable material. The translucent digital video display 30 and all of the electronics associated therewith (including the media player 32) are located in the space or gap 34 between the inner and outer protective panels 26, 28 as described in more detail hereinafter. The gap 34 between the protective panels 26, 28 is preferably filled with an inert gas such as, for example, argon. The illustrated cooler door 20 is also provided with suitable hinges 38 on one side and a handle 40 on the opposite side but it is noted that the cooler door 20 can alternatively have any other suitable configuration.

The illustrated translucent digital video display 30 is an LCD video display or panel but any other suitable type of digital video display can alternatively be utilized. The translucent LCD video display can include liquid crystal optical films, in place of traditional LCD backlights. The translucent digital video display 30 is see-through in that it can be gazed through to the opposite side when the display 30 is powered on so that products or items 18 located behind the translucent digital video display 30 can be seen through the translucent digital video display 30. Suitable translucent LCD video panels are available from Samsung and LG Electronics. The illustrated cooler door 20 has a single rectangular translucent LCD video panel that is sized smaller than the protective panels and is oriented in a portrait direction but it is noted that more than one translucent LCD video panel can alternatively be utilized, other suitable shapes, sizes and orientations of the translucent LCD video panel can alternatively be utilized, and/or the translucent LCD video panel can extend entirely to the frame 36.

The illustrated translucent digital video display 30 is located within the sealed space 34 between the outer and inner protective panels 26, 28. The illustrated translucent digital video display 30 is supported within the space 34 by spacers 42 located at the four sides of the translucent digital video display 30 and extend from the frame 36 to position and support the translucent digital video display 30 within the space 34. It is noted that the translucent digital video display 30 can alternatively be supported in any other suitable manner. The illustrated door 20 is provided with shields 44 located within the protective panels 26, 28 to block the view of the interior space 34 through the protective panels 26, 28 about the translucent digital video display 30. It is noted that when the translucent digital video display 30 extends to the frame 36, the shields 44 are not required. It is also noted that the shields 44 can be integral with and/or formed by the spacers 42. Also located within the sealed space 34 between the outer and inner protective panels 26, 28 is a display panel power and signal control board 46 operably connected to the translucent digital video display 30.

The illustrated media player 32 is located within the sealed space 34 between the outer and inner protective panels 26, 28 and has integrated memory and an integrated wireless communication system. The memory can be flash or solid state based storage and the communication system can be a wireless radio (for example, either 802.11 or cellular 3G/4G) with an embedded radio antenna. It is noted, however, that any other suitable memory and/or communication system can alternatively be utilized. For example, the wireless connection can be replaced with a hard wire connection. The media player 32 can include single board computer Media Player hardware with embedded storage (powered by, for example, Intel Atom or ARM based processors). Operating system software is provided on the media player 32. The operating system software can be a standard operating system such as, for example, Microsoft Windows or Linux. Application software is also provided on the media player 32 to receive media files, play media files and record play information for future auditing of play history. The application software can be a standard media player software such as, for example, ActiVia for Media available from STRATACACHE, Inc., of Dayton, Ohio. The illustrated media player 32 is connected to the power and signal control board 46 by a cable 48. The cable 48 can be any suitable standard cable such as, for example, a HDMI or LVDS cable.

The illustrated digital display system 12 also includes a DC power bus 50 located within the sealed space 34 between the outer and inner protective panels 26, 28. The DC power bus 50 provides ongoing power to both the media player 32 and the power and signal control board 46 of the translucent digital video display 30. The DC power bus 50 is electrically connected with the media player 32 and power and signal control board 46 with cables 52, 54. The cables 52, 54 can be any suitable standard power cables. The DC power bus 50 is adapted to receive power from the power source 22 in any suitable manner. The illustrated DC power bus 50 receives power from the power source 22 through a cable 56 extending through the door hinge 38 but any other suitable method can alternatively be utilized.

Figure 4:
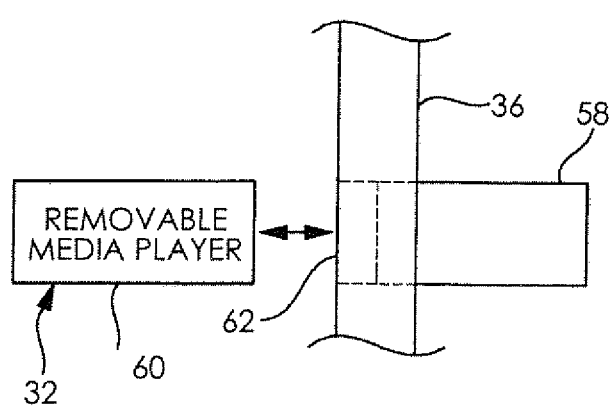
FIG. 4 is an enlarged diagrammatic view showing a portion of the door of FIG. 3 in the area of a removable media player.
Figure 5:
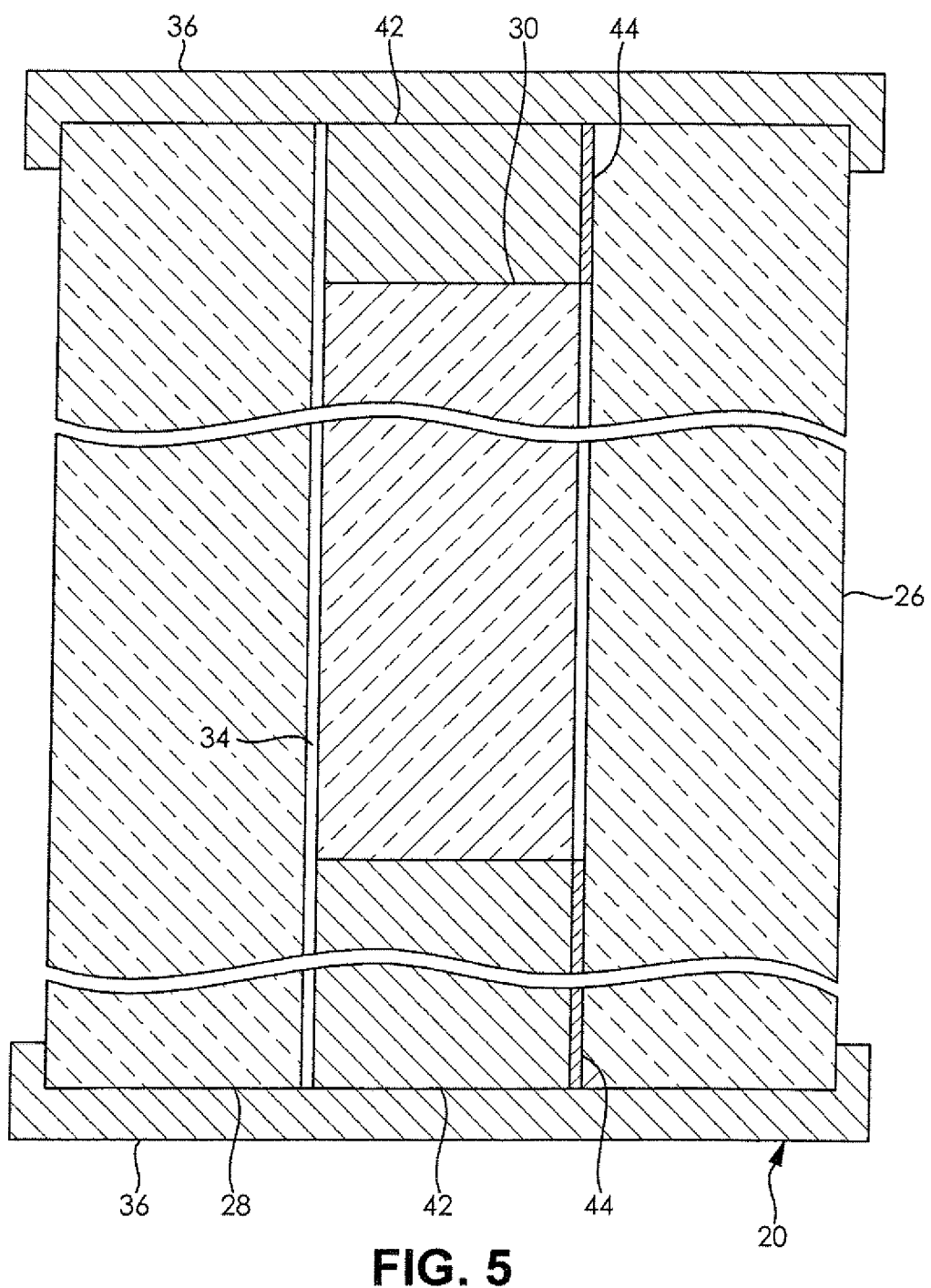
FIG. 5 is a diagrammatic view of a cross-section of door of FIG. 3 taken along line 5-5.

As best shown in FIG. 4, the illustrated media player 32 includes a base or receiver portion 58 having a slot and a removable portion 60 which is insertable into and removable from the slot so that it is easily serviceable. The fixed cable connections with the DC power bus 50 and the power and signal control board 46 of the translucent digital video display 30 are each to the base portion 58 while all the electronics (memory, radio, etc.) are located within the removable portion 60. The illustrated frame 36 includes a removable door 62 to access the removable media player 60. It is noted that the base portion 58 is adequately secured and sealed to the frame 36 so that accessing the removable media player 60 does not affect the sealed interior space 34 of the door 20. This "slotted" media player architecture allows the media player 60 to slide into the slot connected or proximate to the translucent digital video display 30 with the permanent connection cable 48 from the slotted "receiver" interface 58 to the power and signal control board 46 of the translucent digital video display 30. This removability allows the media player to be easily serviced and replaced/upgraded. The inclusion of the wireless radio into the media player 32 prevents an external cable, such as an Ethernet cable, connection from being required to communicate with the media player 32 and allows the wireless radio to also be easily serviced and replaced/upgraded.

It is noted that the illustrate translucent display system 12 in the form of a cooler door 20 is a fully self-contained package. The intelligent media player 32 being built within the enclosure allows the media player 32 to be self-contained within the door 20 with no external cables, media player interface, or other device requiring cable connectivity back into the sealed door 20. In other applications, the self-contained packaging eliminates the need for secondary cables to connect to the unit to provide network connectivity. The only connection required is a single connection to the power source 22.

Figure 3:
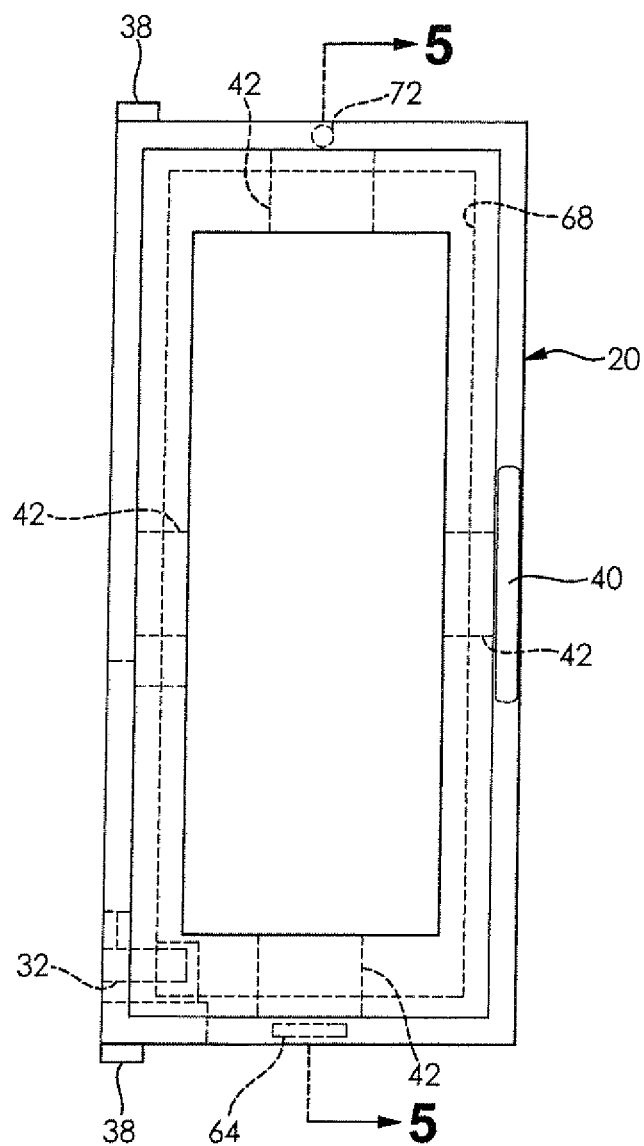
FIG. 3 is a diagrammatic view of one of the doors of the cooler of FIGS. 1 and 2 showing components of the translucent digital display system.
Figure 6:
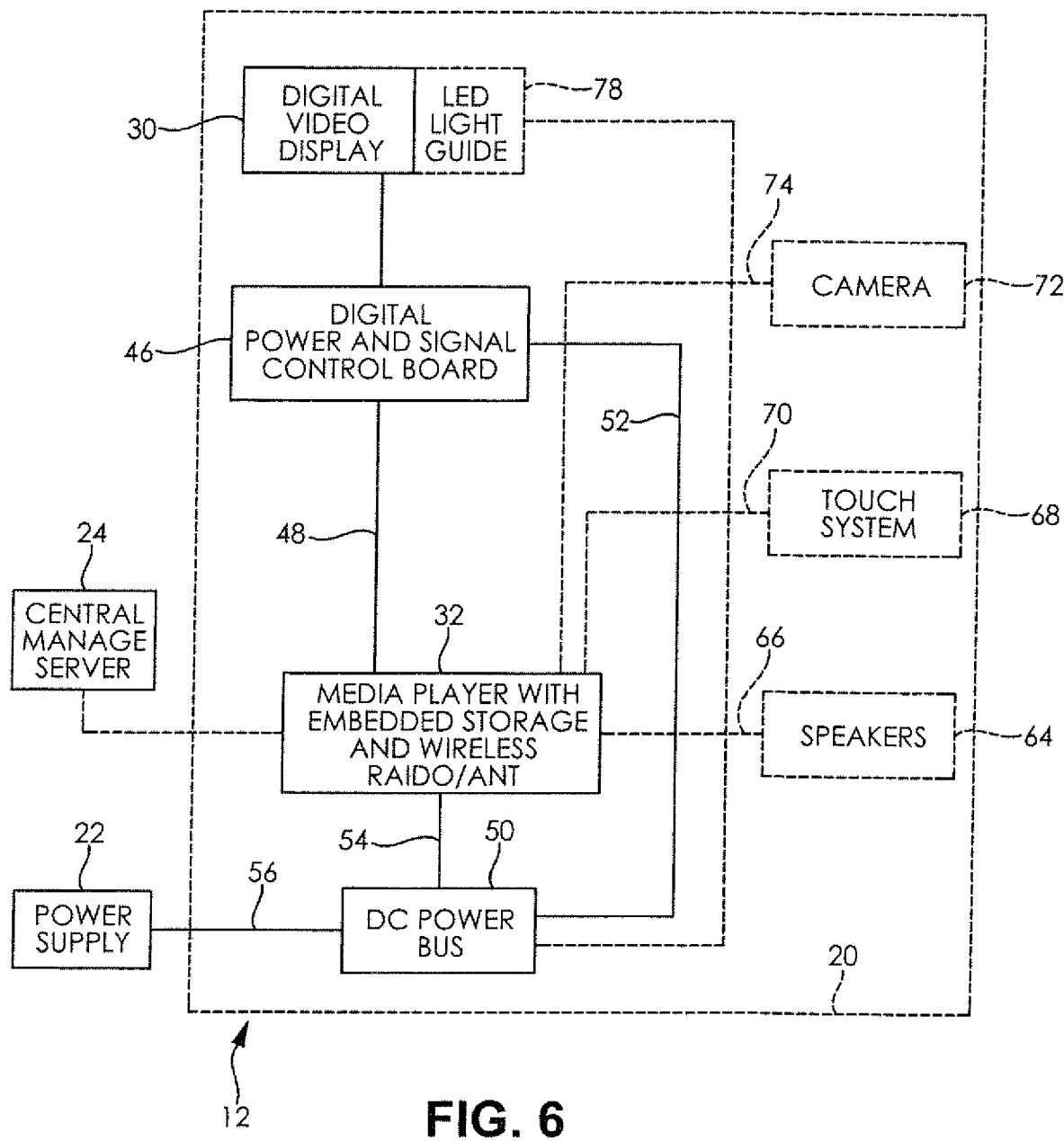
FIG. 6 is a schematic view the digital display system of the cooler of FIGS. 1 and 2.

As best shown in FIGS. 3 and 6, audio speakers 64 can be provided within the interior space 34 if desired to provide audio for the videos on the translucent digital video display 30. The illustrated speakers 64 are provided in the frame 36 at the bottom of the door 20. The illustrated speakers 64 are connected to the media player 32 by cables but any other suitable connection can alternatively be provided.

As best shown in FIGS. 3 and 6, an infrared sensor or touch detection system 68 can be provided if desired to provide touch interactivity with the translucent digital video display 30. The illustrated infrared touch detection system 68 is built into the door surround of the frame 36 but any other suitable configuration can alternatively be utilized. The system 68 is operably connected to the media player 32 by a suitable cable 70 or the like. The sensor or touch detection system 68 allows a consumer to interact with the content or application running on the digital video display 30 via a touch interface. The touch interface system 68 can allow a customer to perform search functions on a specific door for product, recipe, coupon or other consumer enticements. It is noted that any other suitable touch interface system 68 such as, for example, a touch pad or key pad, can alternatively be utilized.

As best shown in FIGS. 3 and 6, a consumer facing camera 72 can alternatively be provided if desired to provide motion interactivity with the translucent digital video display 30. The illustrated camera 72 is located at the frame 36 at the top of the door 20 so that it looks down on customers but any other suitable configuration can alternatively be utilized. The consumer facing camera 72 can be a micro USB camera or the like and operably connected to the media player 32 by a suitable cable 74 or the like. The camera interface system 72 allows a consumer to interact with the content or application running on the digital video display 30 via motion such as, for example, waving hands or the like. The camera motion interface 72 can allow a customer to perform search functions on a specific door for product, recipe, coupon or other consumer enticements. Audience measurement software or the like can be run by the media player 32 and can be, for example, Audience Measurement available from STRATACACHE, Inc., of Dayton, Ohio. It is noted that any other suitable motion interface 72 can alternatively be utilized.

Figure 7:
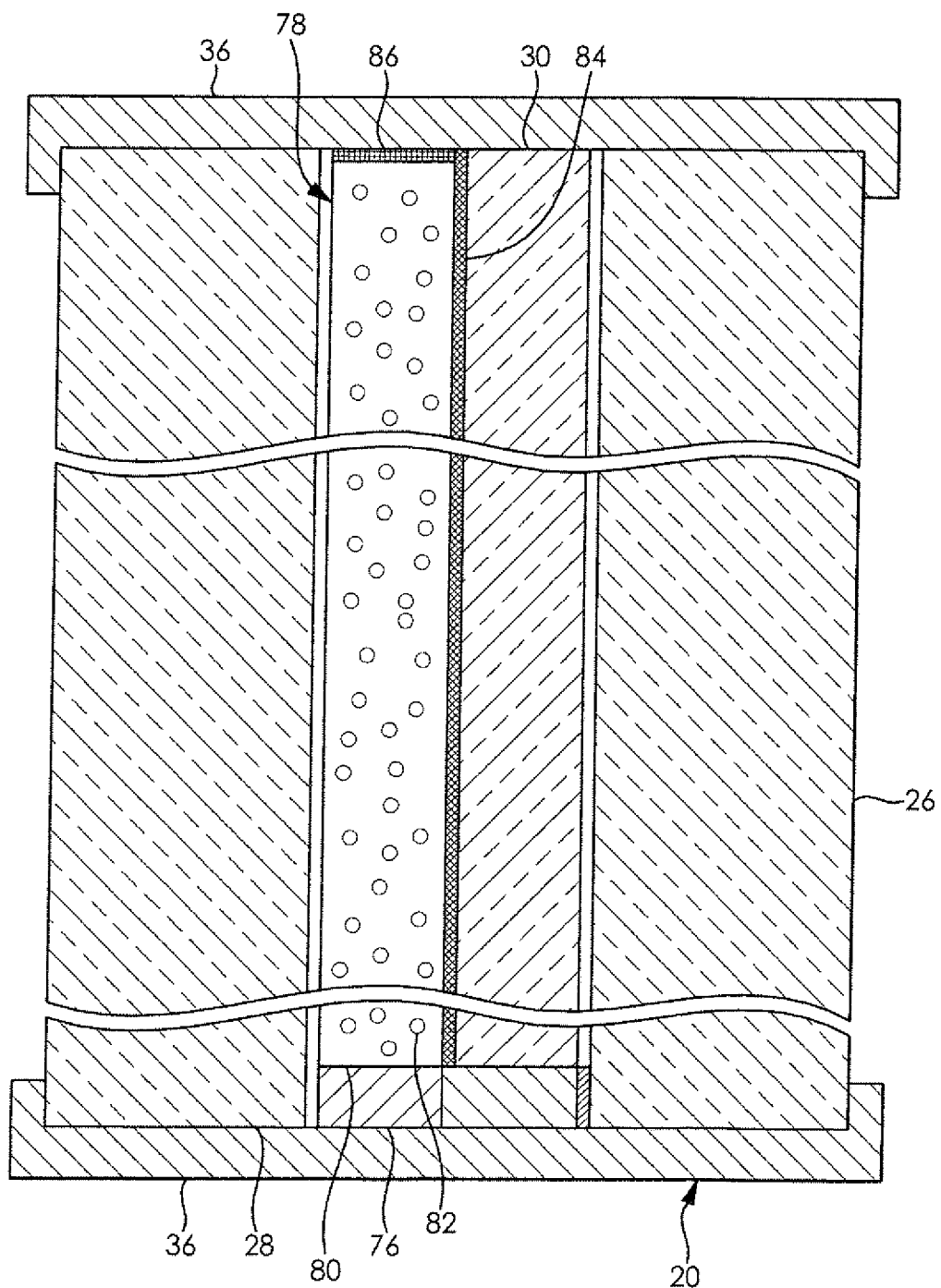
FIG. 7 is a diagrammatic view similar to FIG. 18 but showing an alternative embodiment of the of translucent digital display system.

Under conditions where there are multiple items 18 behind the translucent digital video display 30, the items 18 can block light from passing though the translucent digital video display 30 such that it is difficult to view. Particularly when the items 18 are dark or black. This problem can be solved by providing a light source 76 along with a light guide 78 to provide light between the product 18 and the translucent digital video display 30. As best shown in FIG. 7, the translucent digital video display 30 can be secured to the light guide 78 in the form of transparent specialty glass panel or plate 80 with the light source providing light to at least one edge of the glass plate 80. The glass plate 80 is provided with embedded micro-particles 82 that reflect light out the faces of the glass plate 80. Suitable glass plates 80 are available from Corning Inc. The illustrated light source 76 is at least one LED but any other suitable light 76 source can alternatively be utilized. The light source 76 can be connected to the DC bus 50 for power by a power cable and/or to the media player 32.

The translucent digital video display 30 is preferably chemically bonded to the specialty glass plate 80 using a suitable chemical bonding agent 84 in a vacuum chamber within a clean room environment. Prior to the chemical bonding, preparation of the glass plate 80 includes polishing all edge surfaces of the glass plate 80, the application of a reflective film or tape 86 to the edges of the glass plate 80 to reflect light inward toward the center of the glass plate 80. Once the translucent digital video display 30 is bonded to the glass plate 80, the edge light source 76 is attached (outside of the viewing surface) which allows light to be carried through the glass plate 80 and evenly or uniformly distributed towards the viewer through the outer protective panel 26 as the light is reflected out the face of the glass panel 80 when it strikes the micro-particles 82. Thus, additional light is directed through the translucent digital video display 30 to add directed light to the consumer's experience without the consumer seeing the origin point of the additional light or blocking the consumer's view of the product 18 behind the translucent digital video display 30.

Figure 8:
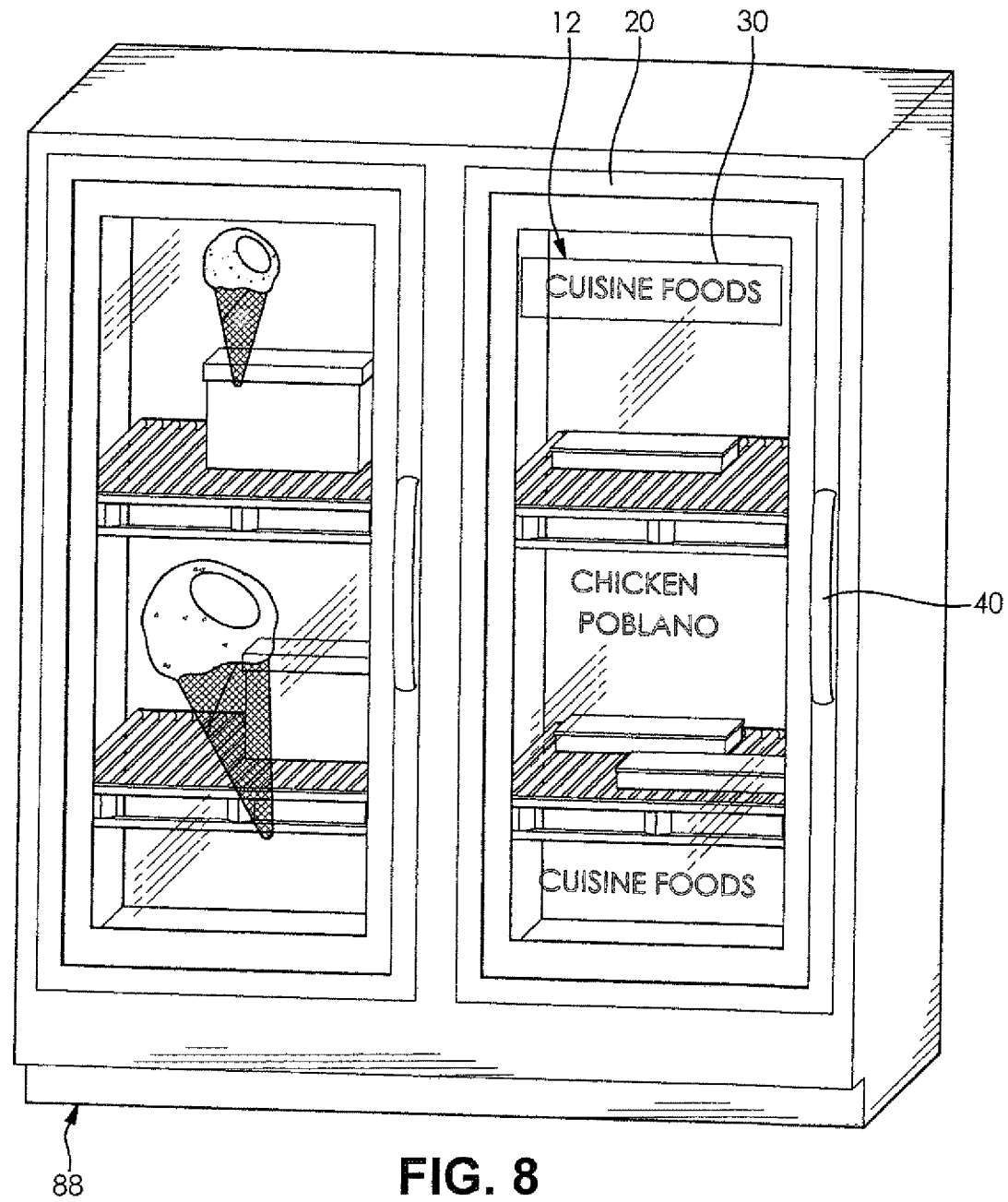
FIG. 8 is a perspective view of a double glass-door upright freezer incorporating a translucent digital display system according to another embodiment of the present invention.

FIG. 8 illustrates a double glass-door upright freezer 88 having the translucent digital display system 12 according to the present invention. The illustrated upright freezer 88 shows that the translucent display system 12 can be incorporated into other types of product displays having product viewable through glass panels. The illustrated freezer 88 is substantially the same as the cooler 12 described hereinabove except the freezer 88 is designed for frozen product 18 rather than chilled product 18 like the above described cooler 10. The illustrated freezer 88 shows that a frozen food advertisements can be displayed on the translucent digital video displays 30 so that customers see the advertisements and can look straight through the advertisements on the translucent digital video displays 30 to see frozen food product 18 on shelves 16 within the freezer 88 and behind the doors 20.

Figure 9:
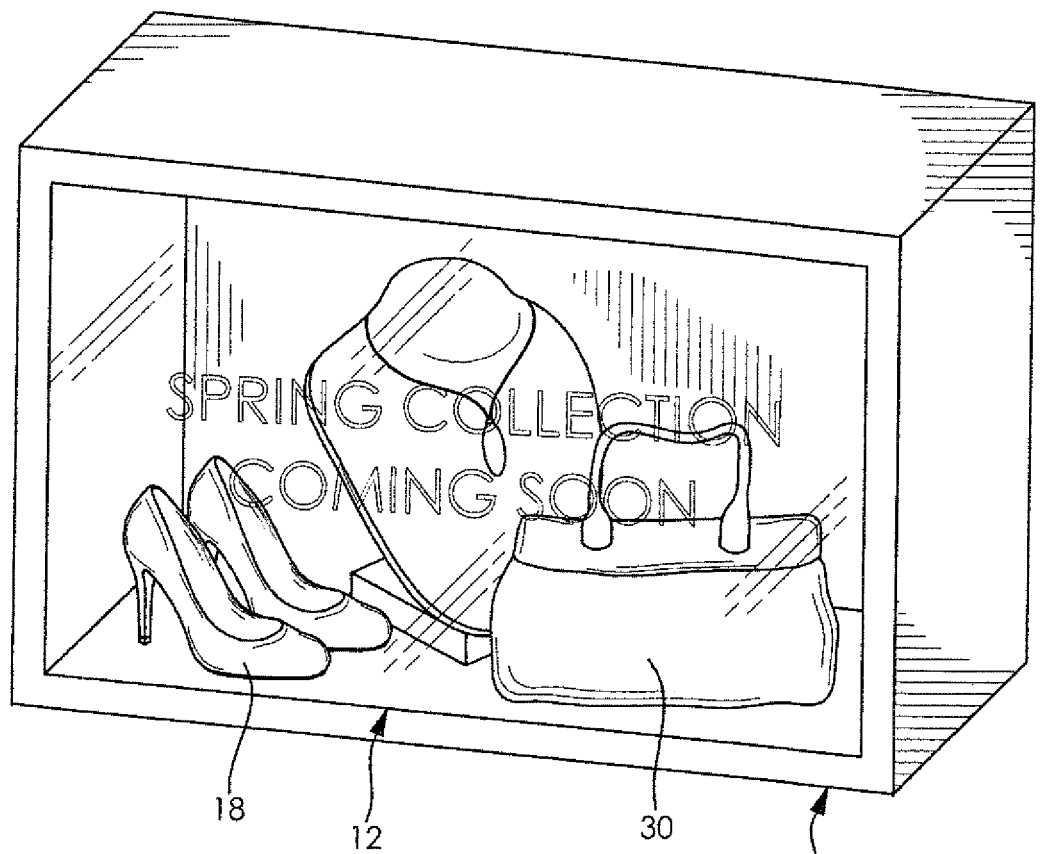
FIG. 9 is a perspective view of an architectural glass window incorporating a translucent digital display system according to yet another embodiment of the present invention.

FIG. 9 illustrates an architectural window 90 having a translucent digital display system 12 according to the present invention. The illustrated window 90 shows that the translucent digital display system 12 can be incorporated into fixed architectural glass assemblies such as windows, doors, and the like. The illustrated window 90 is substantially the same as the cooler doors 20 described hereinabove except that it is adapted to be a fixed display window 90 rather than a display door 20. The illustrated window 90 shows that a stationary advertisement can be displayed on the translucent digital video display 30 so that customers see the advertisement and can look straight through the advertisement on the translucent digital video display 30 to see consumer goods 18 located behind the window 90.

From the foregoing disclosure it will be apparent that the translucent digital display systems 12 according to the present invention can incorporated into any glass enclosure such as, for example, product display cases like freezers, coolers, jewelry cases, liquor cases, cosmetic cases, and the like or architectural glass like entry doors, windows, drive-thru windows, teller windows, and the like.

Any of the features or attributes of the above described embodiments and variations can be used in combination with any of the other features and attributes of the above described embodiments and variations as desired.

From the foregoing disclosure and detailed description of certain preferred embodiments, it will be apparent that various modifications, additions and other alternative embodiments are possible without departing from the true scope and spirit of the present invention. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

The invention claimed is:

1. An enclosure having a refrigeration system to keep product displayed in the enclosure at a desired temperature, said enclosure including a door with a digital system, said door comprising, in combination:
   a transparent outer protective panel and a transparent inner protective panel, the inner and outer protective panels being spaced apart and having a sealed interior space defined only between the inner and outer protective panels, wherein
   the sealed interior space is filled with an inert gas;
   a frame encircling peripheries of the outer and inner protective panels and enclosing outer edges of the outer and inner protective panels;

a translucent digital display located between, and separate from, the inner and outer protective panels in the sealed interior space; and a media player located within the sealed interior space and operably connected to the translucent digital display so that images and/or video displayed on the translucent digital display are viewed through the outer protective panel and items located behind the inner protective panel can be viewed through the translucent digital display, wherein a portion of the media player is sealed relative to the sealed interior space, and wherein at least another portion of the media player is removable from the door without affecting the sealed interior space; wherein the door, including the outer and inner protective panels, the translucent digital display, and the media player, is configured to move as a self-contained unit relative to the rest of the enclosure.

2. The enclosure of claim 1, further comprising:

a light guide;

a light source adjacent the light guide to provide light that strikes the light guide and is reflected out through the outer protective panel; and wherein the door, including the outer and inner panels, the translucent digital display, the light guide, the light source, and the media player, is configured to move as a self-contained unit relative to the rest of the enclosure.

3. The enclosure of claim 2, wherein the light guide includes a glass panel secured to the translucent digital display, the glass panel including micro-particles therein for reflecting light;

the light source comprises at least one LED adjacent the glass panel to provide light within the glass panel that strikes the micro-particles and is reflected out through the outer protective panel to provide visibly uniform illumination through the outer protective panel at the translucent digital display;

the media player comprises a receiver portion and a removable portion which is removably received in the receiver portion, and wherein the receiver portion is sealed relative to the sealed interior space such that the removable portion of the media player is removable from the receiver portion without affecting the sealed interior space; and wherein the removable portion of the media player is removable from within the receiver portion through an access door in the frame.

4. The enclosure of claim 1, wherein the media player comprises a receiver portion and a removable portion which is removably received in the receiver portion, and wherein further the receiver portion is sealed relative to the sealed interior space such that the removable portion of the media player is removable from the receiver portion without affecting the sealed interior space.

5. The enclosure of claim 2, wherein the media player comprises a receiver portion and a removable portion which is removably received in the receiver portion, and wherein further the receiver portion is sealed relative to the sealed interior space such that the removable portion of the media player is removable from the receiver portion without affecting the sealed interior space.

6. The enclosure of claim 1, wherein the door further comprises a consumer-facing camera operably connected to the media player.

7. The enclosure of claim 1, wherein the door further comprises a touch-detection system operably connected to the media player.

8. The enclosure of claim 1, wherein the inner and outer protective panels are of greater length and width than the translucent digital display.

9. An enclosure having a refrigeration system to keep product displayed in the enclosure at a desired temperature, said enclosure including a door with a digital system, said door comprising, in combination:

a transparent outer protective panel and a transparent inner protective panel, the inner and outer protective panels being spaced apart and having a sealed interior space defined only between the inner and outer protective panels, wherein the sealed interior space is filled with an inert gas;

a frame encircling peripheries of the outer and inner protective panels and enclosing outer edges of the outer and inner protective panels;

a translucent digital display located in the sealed interior space between, and separate from, the inner and outer protective panels; and a media player located within the sealed interior space and operably connected to the translucent digital display so that images and/or video displayed on the translucent digital display are viewed through the outer protective panel and items located behind the inner protective panel can be viewed through the translucent digital display; wherein the door, including the outer and inner protective panels, the translucent digital display, and the media player, is configured to move as a self-contained unit relative to the rest of the enclosure.

10. The enclosure of claim 9, wherein a portion of the media player is sealed relative to the sealed interior space, and wherein at least another portion of the media player is removable from the door without affecting the sealed interior space.

11. The enclosure of claim 10, wherein the media player comprises a receiver portion and a removable portion which is removably received in the receiver portion, and wherein the receiver portion is sealed relative to the sealed interior space such that the removable portion of the media player is removable from the receiver portion without affecting the sealed interior space; and wherein the removable portion of the media player is removable from within the receiver portion through an access door in the frame.

12. The enclosure of claim 9, further comprising:

a light guide; and a light source adjacent the light guide to provide light that strikes the light guide and is reflected out through the outer protective panel;

wherein the door, including the outer and inner panels, the translucent digital display, the light guide, the light source, and the media player, is configured to move as a self-contained unit relative to the rest of the enclosure.

13. The enclosure of claim 12, wherein further:

the light guide includes a glass panel secured to the translucent digital display, the glass panel including micro-particles therein for reflecting light;

the light source comprises at least one LED adjacent the glass panel to provide light within the glass panel that strikes the micro-particles and is reflected out through the outer protective panel to provide visibly uniform illumination through the outer protective panel at the translucent digital display.

14. The enclosure of claim 9, wherein the door further comprises a consumer-facing camera operably connected to the media player.

15. The enclosure of claim 9, wherein the door further comprises a touch-detection system operably connected to the media player.

16. The enclosure of claim 9, wherein the inner and outer protective panels are of greater length and width than the translucent digital display.

\* \* \* \* \*